Sept. 8, 1942.   C. R. FORDYCE ET AL   2,295,394
COATING APPARATUS
Filed May 15, 1940

CHARLES R. FORDYCE
WALKER F. HUNTER
KARL G. PLEGER
INVENTORS

BY
ATTORNEYS

Patented Sept. 8, 1942

2,295,394

UNITED STATES PATENT OFFICE 2,295,394

COATING APPARATUS

Charles R. Fordyce, Walker F. Hunter and Karl G. Pleger, Rochester, N. Y., assignors to Eastman Kodak Company, Rochester, N. Y., a corporation of New Jersey Application May 15, 1940, Serial No. 335,336

1 Claim. (Cl. 18—15)

This invention relates to coating apparatus for coating solutions into a continuous sheet or film, and more particularly to an improved apparatus which can be employed in forming continuous sheeting and film support from various types of coating solutions.

It has been the common practice for some time in the art of forming thin sheeting and film base to spread a thin coating of the desired material, generally a solution of a cellulose ester in a low boiling solvent onto a heated surface and cause the solvent to evaporate therefrom. The method usually employed consists of feeding the hot solution or dope in a thin stream from an appropriate feeding device onto the polished metallic surface of a slowly rotating wheel or drum which is heated to approximately the temperature of the coating solution. The solvent evaporates from the film more or less progressively as the wheel turns. In less than a complete revolution sufficient solvent has been evaporated to permit the film to be removed from the wheel and conveyed to a wind up or carried over other rolls or drums for further curing treatment.

The device usually employed for feeding the solution to the coating wheel comprises a V-shaped hopper provided with spaced apart blades at the apex of the V to form a coating slot. A general characteristic of these hoppers is that they are mounted so that the coating slot is within a few thousandths of an inch from the film forming surface.

Recently there have been developed new types of coating solutions which require, it was found, different coating apparatus and processes. Such new coating solutions include those which are formed into a sheet or film by lowering the temperature of the thin stream of coating solution, flowing from the coating device onto a film forming surface, below the gelation point of the solution; and solutions which coagulate to form a gel when subjected to moisture vapors; and also those which form gels by loss by evaporation of one or more of the component solvents of the coating solution.

When such solutions from which gel like films can be formed were coated from the apparatus heretofore employed in coating evaporative type solutions various unforeseen difficulties arose. While certain features of the present invention are adaptable for apparatus and processes for coating all of the above mentioned "gel dopes" our invention is particularly adapted for use in coating solutions or dopes which are capable of gelling with reductions in temperature.

The "gel dope" which the present apparatus is particularly adapted to coat may be formed by dissolving at elevated or moderately elevated temperatures certain cellulose organic acid esters such as cellulose acetate propionates and cellulose acetate butyrates and the like in a solvent mixture consisting of propylene chloride and ethylene chloride or propylene chloride and a lower aliphatic alcohol to give solutions or dopes which are susceptible of gelation by a rapid lowering of temperature. Since the film or sheet is formed by a reduction in temperature the film forming surface is maintained at a lower temperature than heretofore employed with evaporative type dopes. The sheet or film resulting from such gelation may be stripped from the casting surface almost immediately after casting and while containing nearly all or at least a large proportion of the original solvent. In short, these types of dope can be maintained as fluids at temperatures above 50° C. and when allowed to cool to or below a critical temperature between 10° C.–50° C., depending on the composition, they form transparent gels which remain homogeneous throughout the gelling operation. This gelation occurs within approximately 20° C. of the flowable solution point. When the gels are first formed they do not adhere strongly to the forming surface and although the gelled film contains relatively large amounts of solvent, i. e. an amount of solvent equal to or greater than the weight of the cellulose ester, the gelled film is sufficiently strong and resistant to deformation so that it can be continuously stripped from the coating wheel. On leaving the coating wheel, the gel-like film is usually further dried to reduce the solvent content to a minimum. This can be done without employing high temperature since the structure of the gels is such that they readily release the volatile solvent.

As above pointed out these gel dopes change from a fluid to a gel within a relatively few degrees of temperature. In coating the ordinary type dope, heretofore employed in the art, onto a heated wheel only small temperature variations are permitted to exist between coating solution and drum surface. When the regular coating apparatus was employed in coating the gel dopes onto a cooler wheel, the proximity of the hopper slot to the cooler wheel caused a sufficient temperature drop in the hopper lips to permit formation of slugs on the edges of one or both of the hopper lips. These slugs projected into the dope stream and gave rise to uneven coating and the formation of streaks in the finished product. In forming photographic film base such imperfections are, of course, very undesirable.

In accordance with one feature of the present invention we have found that if the coating slot of the hopper is positioned at a relatively great distance above the coating wheel, i. e., 1 to 2 inches as compared with the 40 or 50 thousandths of an inch previously employed in connection with other types of coating solutions, that an improved continuous gel type sheet may be formed.

In accordance with another feature of the invention the stream of hot gel dope is shielded from atmospheric temperatures as it passes from the coating slot to the coating wheel by suitable shielding members.

In accordance with a third feature of the invention there is provided a plurality of jets preferably situated in the vicinity of the coating slot for releasing hot solvent vapors on and adjacent the blades defining the coating slot.

Preferably these three features of the invention are all employed but, however, one or more may be used as may be desirable.

It will be noted that each feature tends to restrict abrupt cooling of the stream of gel dope flowing from the hopper to the coating wheel. By such temperature regulation of the dope stream a continuous thin sheet suitable for photographic film base can be made.

An object of the present invention is improved apparatus for the continuous production of transparent sheeting and film support.

Another object of the present invention is an improved apparatus for coating solutions which change into gels with a reduction of temperature to form a sheet or film.

A further object of the invention is an improved coating apparatus which is particularly adapted for coating heated solutions onto sheet or film forming surfaces maintained at relatively lower temperatures.

In accordance with the invention these and other objects are attained by coating a heated film forming solution from an apparatus having a coating hopper wherein the location of the coating slot is at a position remote from the surface of a coating wheel which is preferably maintained at a relatively lower temperature than the solution. The coating slot and the coating solution flowing therefrom are encased by adjacent portions of the hopper to shield the blades defining the coating slot from cold air currents which otherwise might be set up between the coating wheel and the coating slot.

To protect these blades further from the chilling effects of the cold wheel there may be positioned within the encased portion of the hopper and adjacent the blades one or more conduits for introducing hot vapors of a solvent preferably one which is a solvent of the cellulosic material in the dope and which is compatible with the solvent of the dope. This hot solvent vapor will prevent the solidification of any dope on the blades defining the slot and will tend to maintain the temperature adjacent the slot and between the slot and the coating surface above that which will congeal the dope. The temperature of the solvent vapors may vary depending on the solution employed. In most instances it is preferable to super-heat these vapors.

Depending somewhat on the composition of the dope, the amount of solvent vapor employed may vary. In some cases it may be desirable to employ a saturated or super-saturated solvent atmosphere around the coating slot.

By employing this apparatus and process a sheet or film of excellent quality and dimensions can be made.

The invention will be more clearly understood by reference to the following detailed description and accompanying drawing, in which.

Figure 1:
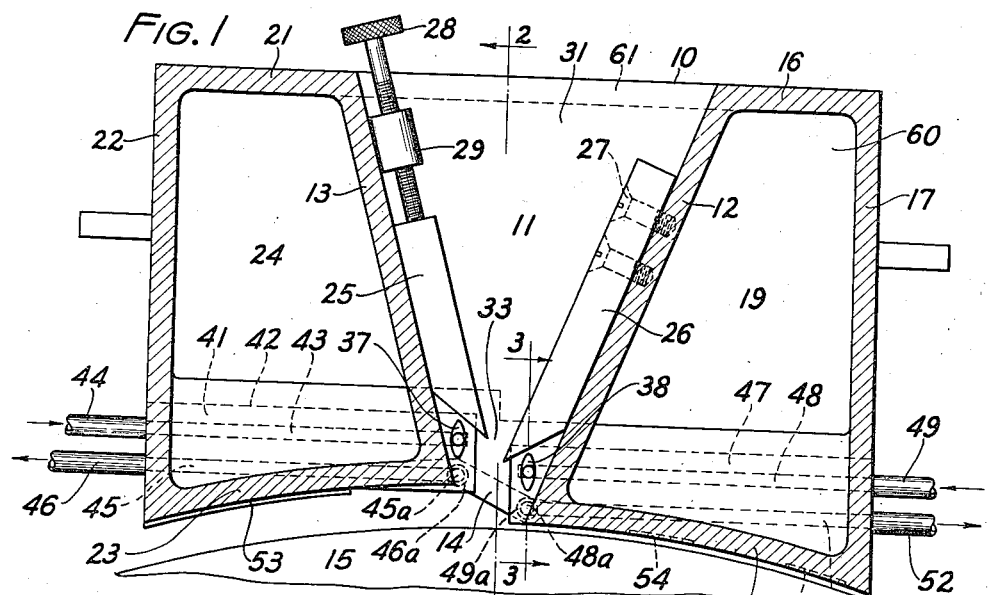
Fig. 1 is a sectional view in elevation of the preferred type of coating hopper.

Referring to Fig. 1 there is shown a coating apparatus 10 having a V shaped hopper 11 therein formed by slanting walls 12 and 13 and end walls one of which is shown at 31. At the apex of the slanting walls 12 and 13 there is a slot 14 thru which the coating solution flows to the coating wheel or drum 15. The remainder of the coating structure at the right of slot 14 comprises walls 16, 17 and 18 which with slanting wall 12 encloses a heating chamber 19. The lower or base wall 18 has a contour similar to that of the coating wheel 15 and extends over a substantial arc of the wheel 15. At the other side of the slot 14 another heating chamber 24 is formed by walls 13, 21, 22 and 23. The lower wall 23 also has a contour similar to that of wheel 15 but is positioned remotely from wheel 15 as contrasted with wall 18 at the other side of slot 14.

As will be understood the space 11 is filled with coating solution, and to regulate the thickness of the sheets or film being coated blades 25 and 26 are positioned on walls 13 and 12, respectively. As shown in Fig. 1 blade 26 is fixedly attached to wall 12 by screws 27, while as shown more clearly in Fig. 2, blade 25 is movably mounted on wall 13 and can be moved toward or away from blade 26 by means of turn screws 28 and 30 which engage, respectively, members 29 and 32 mounted on wall 13. By moving blade 25 up or down, the width of the coating slot 33 may be adjusted to give a desired flow of solution from the hopper. It will be noted that the coating slot formed by blades 25 and 26 is remotely positioned from the coating wheel 15 and is shielded by the downward extensions of walls 12 and 13; and 31 and 34 shown more clearly in Fig. 2.

Positioned in the end walls 31 and 34 of the hopper adjacent the lower ends of the coating blades are solvent jets 36, 37 and 38. A fourth solvent jet which is positioned adjacent blade 26 at the end opposite that near jet 38 is not shown in the drawing but its relative position is similar to that of jet 37 in Fig. 2.

Figure 2:
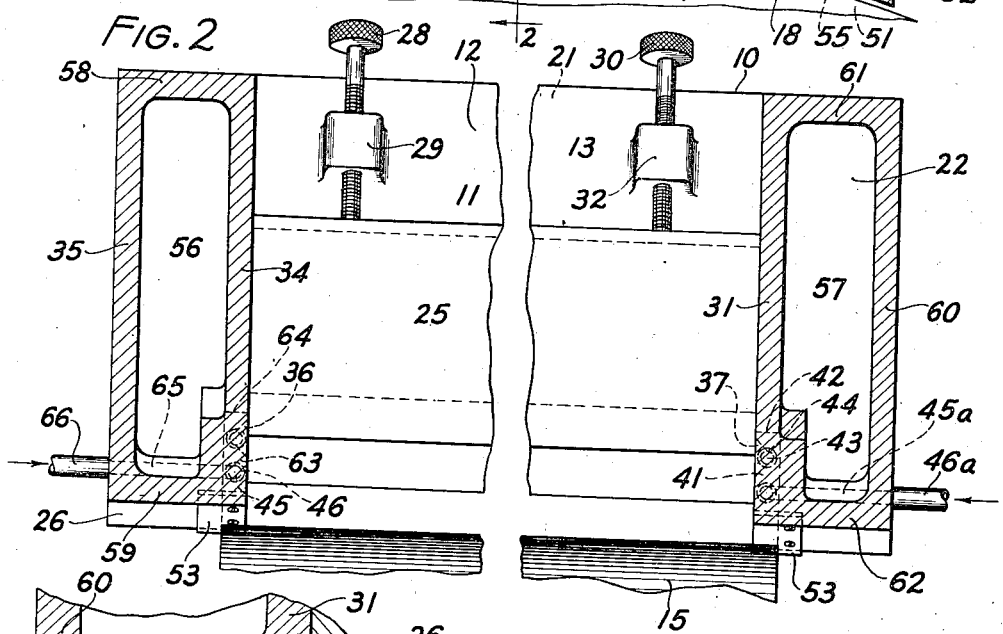
Fig. 2 is a sectional view in elevation taken on the lines 2—2 of Fig. 1.

These jets may be formed of course in various ways, however, as shown in the drawing they may be formed in a block which slides into a slot in the end wall of the hopper. Referring to Fig. 1 two such blocks are shown, that at 41 contains solvent jet 37 and fits in slot 42 in wall 31. A conduit 43 passes from jet 37 thru the block and is connected to supply pipe 44. Also in the block 41 is a steam conduit 45 which passes thru the block and is connected to a steam outlet pipe 46. The steam inlet pipe and conduit is shown in Fig. 2 at 46a and 45a. Jet 38 is similarly positioned in block 47 and is connected to a vapor supply thru conduit 48 and pipe 49. A steam conduit 51 also passes thru the block and is connected to a steam pipe 52. Block 42 is held in position by plate 53. Block 47 is held in position by countersunk plates 54 and 55.

As also shown in Fig. 2 the end heating chamber 56 is formed by walls 34 and 35 and 58 and 59 and the heating chamber 57 on the other end of the hopper by walls 31 and 60 and 61 and 62. Jet 36 is shown in block 63 positioned in slot 64 of wall 34. Steam conduit 65 passes thru this block and is connected to pipe 66.

Figure 3:
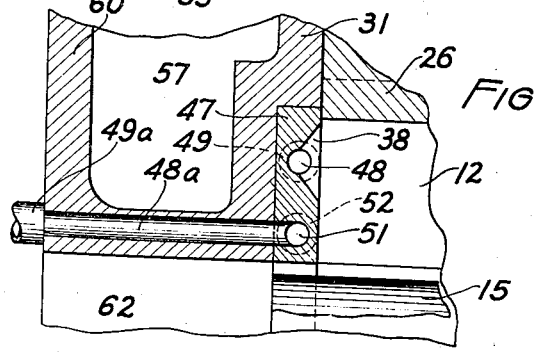
Fig. 3 is a broken away enlarged sectional view taken on the lines 3—3 of Fig. 1.

Fig. 3 shows a view taken on line 3—3 of Fig. 1 of the vapor jet 38 positioned in block 47 with the associated steam line 48a and 49a.

The operation of this coating apparatus will be further understood from the following description of forming a thin sheet from a "gel dope" solution i. e. one which is a fluid at elevated temperatures and a gel at lower temperatures.

A solution of 100 parts by weight of a cellulose acetate butyrate containing 31% acetyl and 16% butyryl in a solvent mixture composed of 300 parts of propylene chloride and 100 parts of ethylene chloride was prepared by mixing the ingredients with continued stirring at 70° C. The solution was then filtered to remove incompletely dissolved particles and fed to the hopper 11 of the film forming apparatus illustrated in Fig. 1. The temperature of the dope in the hopper was maintained at 50° C. by permitting heating fluid to circulate thru the various heating chambers.

Before the solution was permitted to flow to the wheel a super heated vapor of methylene chloride was introduced into the space between the wheel and the coating slot thru the four vapor jets. At the same time steam was passed thru the conduits adjacent the vapor jets to maintain the vapor at high temperature. The blades 25 and 26 of the hopper were then adjusted as to feed a stream of the coating solution having a temperature of 50° C. thru the solvent vapors to the wheel 15 of such thickness as to give an eventual film thickness of .005 inch. The wheel was maintained at a constant temperature of about 15° C. by passing cooling fluids therethru as is well known in the art. Since the coating solution during its flow from the coating slot 33 to the wheel 15 passes thru an enclosed atmosphere which is above the gelling temperature of the solution no gelling takes place until the solution contacts the cold wheel. Furthermore the presence of a solvent of the base of the dope around the ends of the coating slot blades prevents the deposit of particles of the solution on the edges of the blades. The solvent vapors also prevent loss of solvent from the dope stream before it reaches the wheel. The wheel was rotated by means not shown at such a speed that the film remained on the film forming surface for about six minutes. On coming in contact with the wheel the coating solution was transformed into a non-fluid gel and after completing somewhat more than ¾ of a revolution on the wheel the film was stripped off the wheel and further cured in apparatus not shown.

By employing our apparatus we have been able to successfully coat at greatly increased speeds various gel dope solutions and form continuously film support and thin sheeting.

We claim:

A device for coating solutions onto a moving film casting surface to form a continuous film comprising a hopper adapted to contain a solution, a wide opening in the base of the hopper through which the solution may flow to the casting surface positioned thereunder, sheet forming means operable independently of said opening positioned within said hopper and above said opening and said film casting surface for regulating the thickness of the stream of coating solution flowing from the hopper to the casting surface, and vapor jets positioned above said opening but below said sheet forming means adapted to surround the stream of coating solution with a predetermined atmosphere.

CHARLES R. FORDYCE.
WALKER F. HUNTER.
KARL G. PLEGER.